3,154,067
BODY FUNCTION SENSOR
Arthur J. Stenstrom and Richard L. Walus, both of Minneapolis, Minn., assignors, by mesne assignments, to Robert L. Gannon, Minneapolis, Minn.
Filed Oct. 11, 1961, Ser. No. 144,387
5 Claims. (Cl. 128—2.05)

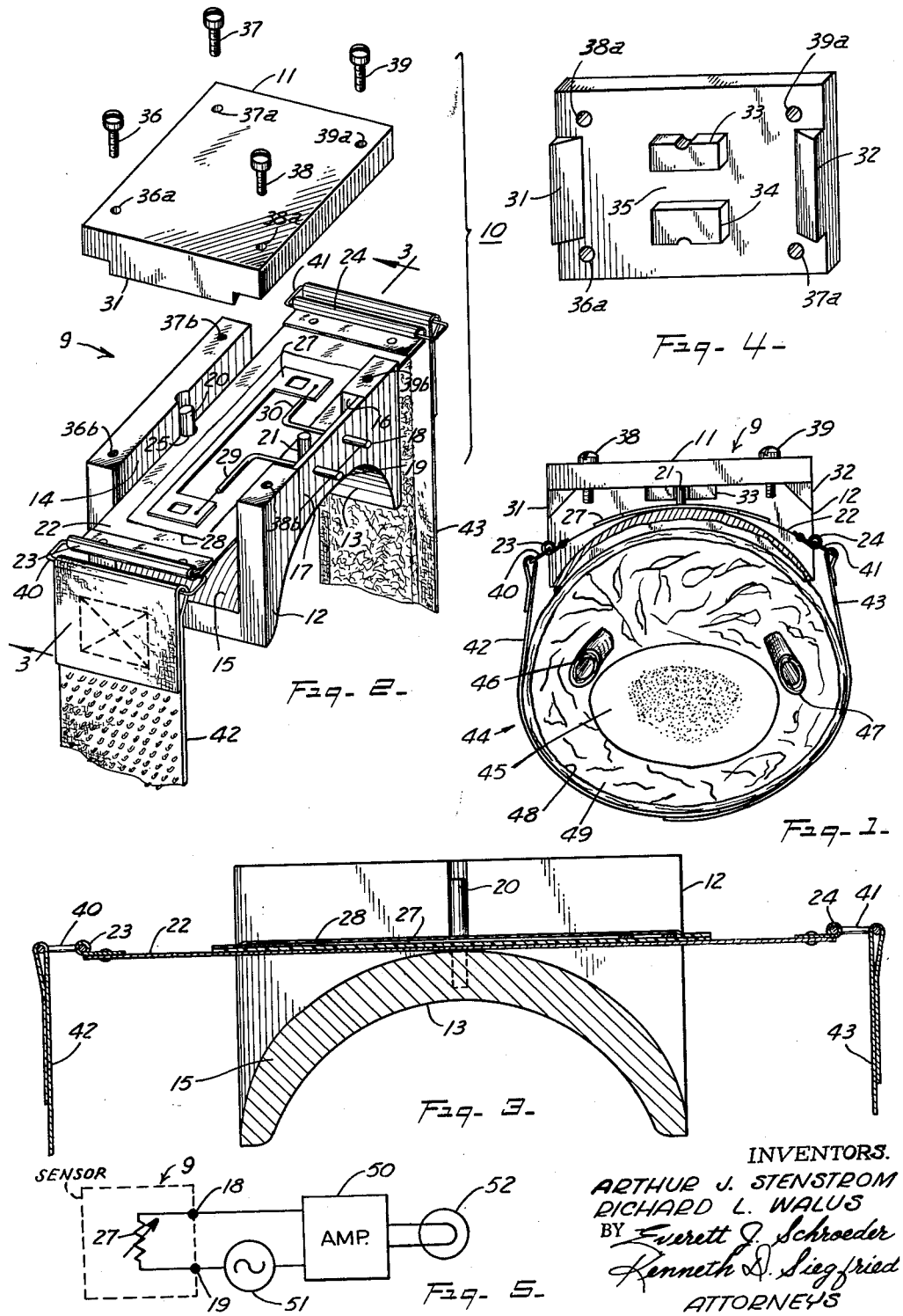

This invention relates to the field of body function sensors and more particularly to the field of sensors for detecting the pulse in the body circulatory system.

Due to the advance in technology, it is desirable to detect certain body functions of patients in hospitals and under certain emergency conditions where the information can be recorded or displayed for use by medical personnel. The information from the sensors is then amplified and recorded for future use in establishing a medical history for the patient or where the patient may be in a post-operative room, the information may be both recorded and displayed so that an accurate history may be established of the patient's recovery. Under certain other emergency conditions, such as emergency rooms in hospitals, and where patients are being transported due to sickness or injury, it may also be highly desirable to have the body function information available to keep track of the condition of the patient. One of the most desirable body functions to be obtained, is the pulse rate, or more particularly, detection of the pulse of the patient which can be compared to a time base to determine the pulse rate. Where the patient is relatively weak, the problem is especially magnified due to the feeble heart beats of some patients, and in fact, some heart beats may not be detectable by the common and ordinary methods now being employed. Furthermore, it is highly desirable that a sensor if used in conjunction with a patient for detecting a body function, be of the type that can be left unattended after being attached to the body.

Some laboratory instruments are adaptable for sensors under the conditions set forth above, but it has been found that they are quite cumbersome in their use. One such instrument, a plethysmograph may be used for detection of the pulse in the circulatory system since it is designed for ascertaining the increase in volume of an organ or part through an increase in the quantity of the blood in the particular organ or part. However, this particular device has disadvantages in that it is not always easily attachable and a pressure seal must be created at the end where the finger or toe is placed inside of the unit. If the pressure seal is lost, due to movement of the finger or toe, the operation of the device would not produce the results desired and would not serve the purpose for which it were intended. The most common practice is to have a person feel the pulse of the patient and count the heartbeats to determine the pulse rate but as indicated previously, the doctor or medical technician, or nurse, may be preoccupied with other duties and be unable to determine the pulse rate.

The present invention contemplates using a deflection measuring device, generally in the form of a strain gauge, to detect minute changes in the appendage surface such as found in the fingers and toes. The deflection member is attached to the body appendage in such a manner that the deflection member is slightly deflected and upon the slight change in volume of the end of the finger, thumb, or toes, the deflection member is temporarily deflected and the strain gauge attached, is used to detect this deflection and transmit a signal representative of the instant the heart beat takes place.

It is therefore a general object of this invention to provide improved means for detecting the pulse in a blood circulatory system of a body.

It is yet another object of this invention to provide a new and novel sensor using strain gauges for detecting body function changes such as heart beat.

It is still a further object of this invention to provide apparatus operating on the principle that a body appendage changes volume temporarily during a heat beat.

It is still a further object of the present invention to provide apparatus which will detect a slight movement of the outer skin of an appendage such as fingers and toes.

It is still another object of the present invention to provide a sensor which may be attached to the body in an easy manner which produces no painful sensations to the patient.

It is still a further object of the present invention to provide a sensor which may sense the pulse of the blood circulatory system in which the sensor may be left attached to a body appendage without after effects.

It is yet another object of the present invention to provide a blood pulse sensor which may be attached to fingers and toes of the human body.

It is still a further object of the present invention to provide a sensor which is relatively shock resistant.

It is another object of the present invention to provide a sensor which may be used with electrical apparatus to produce a signal for energizing an indicator.

These and other objects and advantages of our invention will more fully appear from the following description, made in connection with the accompanying drawings, wherein like reference characters refer to the same or similar parts throughout the several views, and in which:

FIG. 1 is a cross sectional view of a thumb upon which the sensor has been attached where the sensor is shown with one side of the housing broken away;

FIG. 2 is an isometric view of the sensor with the top removed;

FIG. 3 is a sectional view of the sensor taken along lines 3—3 of FIG. 2 showing the general cross sectional shape of the housing;

FIG. 4 is a bottom view of the cover which is shown in FIG. 2; and

FIG. 5 is an electrical schematic representative of the type of circuit in which the sensor would be used.

In describing the operation of a sensor which will detect the change in volume in an appendage due to an increase in volume caused by a slight pressure change in the blood circulatory system, it may be well to briefly set forth the ease with which the device operates due to the body's blood circulatory system. The thumb and fingers of the hand are supplied by the radial and ulnar arteries. In the thumb, the princeps pollicis artery extends along the ulnar side of the metacarpal bone of the thumb to the first phalanx where it divides into two branches and runs along the sides of the thumb. The fingers receive a blood supply through the volaris indicis radialis arteries which are supplied by the radial arteries and through the volar digital arteries supplied by the ulnar artery. The volar digital arteries are divided into a pair of arteries which run along the contiguous sides of the index, middle, ring, and little fingers, where they interconnect freely in the subcutaneous tissue of the finger tips and by smaller branches near the interphalangeal joints. Each of these arteries splits into a couple of dorsal branches which interconnect with the dorsal digital arteries and supply the soft parts on the back of the second and third phalanges, including the matrix of the fingernail. The toes of the feet are supplied mainly by the continuation of the anterior tibial artery which divides into two branches that extend to the toes. The metatarsal arteries then supply the blood to the toes. In addition, the deep plantar artery supplies additional blood to the greater or big toe. Also, the posterior artery terminates in the medial plantar artery to supply the big toe and in the plantar metatarsal arteries to supply the toes where each artery divides into a pair of plantar digital arteries which supply the adjacent sides of the toes. Thus it can be seen that even though the arteries are at the extreme ends of the body evtremities, that there should be a direct communication line through the blood pressure system from the heart to the arteries just described. Keeping in mind, that the heart acts like a pump and the arteries act like hydraulic lines, it can be seen that the pressure will increase in the arteries with each pulsating movement of the blood from the heart into the arterial system.

Referring to FIG. 2, a sensor 9 is shown having a two part housing structure 10 comprising a cover 11 and a block like housing 12. Housing 12 has a bottom surface 13 which is concave in shape or semi-circular in which the semi-circular axis is at right angles to a slot or channel 14 cut in the block like housing 12. The bottom 15 of channel 14 generally follows the same contour as bottom surface 13 but where the bottom surface 15 approaches the outside edges of housing 12, it is formed of a shorter radius and therefore, in cross section, the section of housing 12 between the bottom 15 of channel 14 and the bottom surface 13 of housing 12 is of increasingly smaller dimension from center to the outside edges. When the slot 14 is cut in housing 12, it forms a member which is generally U shaped in cross section as viewed down the longitudinal axis of the channel. One side of the housing 12 above the bottom 15 of channel 14 has an opening 16 cut therein into which is fitted a terminal board 17 that supports a pair of electrical terminals 18 and 19. A pair of posts 20 and 21 are set along side the edges of channel 14 in a vertical position and for this particular application are slightly recessed into the outer walls of the block like housing 12. Situated in the channel 14 is a spring steel longitudinal member 22 which has its ends rolled and fastened so as to form sleeves 23 and 24, there being one on each end of the spring steel member. In the center of the spring steel member 22, is a pair of semi-circular notches, one of which is designated number 25 and the other of which is not shown. These notches cooperate with posts 20 and 21 and the edges of channel 14 to hold the spring member 22 in place so that it may not be moved longitudinally but will be allowed to deflect and bend over the bottom surface 15 of channel 14. Housing 12 and cover 11 may be formed of any suitable material which will readily retain its shape such as lightweight aluminum or certain types of plastics which retain their shape. The spring member 22 may also be formed from certain types of beryllium copper or any other spring like material having the properties of the materials just mentioned. Situated along spring member 22, is a strain gauge 27 and it has been found that strain gauges of the silicon type having a large piezo effect prove to be quite successful. For such strain gauges employing the piezo effect, if mechanical stresses are applied to the strain gauge, the electrical properties of the particular element are changed. Strain gauges which have been found to be quite applicable are those manufactured by Micro Systems, Inc., of San Gabriel, California, and they are laminated between a pair of plastic strips 28 and the strips are then fixedly fastened to the spring member 22 or if they are absent, strain gauge 27 is fastened to the spring member through the use of cement or some other suitable means. The laminated plastic 28 is used to protect the strain gauge element from mechanical and chemical deterrent effects during its use and operation. A pair of conductors 29 and 30 are connected from the ends of strain gauge 27 to terminals 19 and 18 respectively. It will, of course, be understood that other types of strain gauges may be employed in the place of the silicon type strain gauge mentioned above where a proper signal may be obtained from the strain gauge.

Cover 11 has a triangularly shaped pair of protrusions 31 and 32 which project downwardly and depend from cover 11 at the extreme edges of cover 11 and which cooperate with the outer edges of channel 14 so that the triangular shaped pieces fit within the slot or channel and insure that the spring deflection member 22 is loosely secured about posts 20 and 21 and can not slide out of channel 14. To further insure that the longitudinal spring deflection member 22 is loosely held in place, a pair of depending blocks 33 and 34 are formed on the bottom side of cover 11 and they are formed such that there is a space 35 between the blocks so that a strain gauge element 27 fits therebetween and blocks 33 and 34 have notches formed therein which cooperate with posts 20 and 21 to hold member 22 in place. In order to fasten the cover 11 to housing 12, four screws 36 through 39 cooperate with holes 36a through 39a, and extend therethrough into four tapped holes 36b through 39b of housing 12 to hold the cover tightly in place.

A pair of linking members 40 and 41 pass through sleeves 23 and 24 respectively to form a rotatable connection with a pair of binding straps 42 and 43 respectively. These binding straps may be of any suitable material such as light webbing, adhesive tape, or a material sold by the Velcro Corporation of New York, New York, which contains a fuzzy like material on one strip and a plurality of barbed projections on the other strip so that when the two engage they do bind each other. The latter type of construction has been found to work extremely well and may be used a considerable number of times without depreciable wear and produces no discomfort to the patient such as may be experienced with adhesive tape.

*Operation*

Referring to FIG. 1, a cross section of a thumb 44 is shown where the cross section is taken immediately behind the thumb nail. The center potrion 45 represents the bone and a pair of arteries 46 and 47 are shown lying the thumb nail. The center portion 45 represents the description of the circulatory system. The skin 48 surrounding the thumb encloses an annular muscle fiber 49 that surrounds the bone 45 and arteries 46 and 47. Binding straps 42 and 43 are then drawn around the thumb so that spring member 22 is deflected towards the bottom 15 of channel 14 and housing 12 is held in place on the thumb. As shown, the thumb is inverted so that the meaty part of the thumb is in the upward position. Since the skin of the fingers and thumb, and toes, comes closely to the boney structure of these digits at the joints, it will be seen that where the meaty structure lies within the digits, that there is substantially a fixed volume of material. Upon a heartbeat or pulse producing a temporary increase in the blood pressure through arteries 46 and 47, spring deflection member 22 is deflected slightly towards the thumb and since it is pivoted about a central position, or fulcrum point, which lies along an axis formed by posts 20 and 21, the member 22 is flexed at both ends to produce a greater deflection in strain gauge 27. Because of the slight increase in pressure within arteries 46 and 47, the volume increases temporarily and then returns to its original volume and configuration upon the absence of the heartbeat while the blood is being dissipated through the ends of the arteries within the fingers and toes. It has been found that strain gauges such as the type described are sensitive enough to detect deflections of less than one part in ten thousandths of an inch, and therefore a slight change in the resistance of the element is easily created which when placed in an electrical circuit changes the characteristics of the electrical wave shape. In FIG. 5, sensor 9 using strain gauge 27 is represented as a variable resistance with its output terminals 18 and 19 being connected to an amplifier 50 and an alternating voltage source 51 respectively. Alternating voltage source 51 is also connected to amplifier 50 and the output of amplifier 50 is connected to a lamp 52 to produce a visual indication of the slight change in the resistance of strain gauge 27. It will, of course, be understood that any type of indication may be used such as an audible indication or other visual indication, or the signal may be applied to some form of recorder where the signals are recorded on a time base. Depending on the type of material used in attaching the sensor to a body appendage such as the fingers and toes, some care should be taken to insure that the binding material 42 and 43 is not drawn so tightly as to cause the spring member 22 to be drawn against the bottom edge 15 of channel 14 along its entire surface. That is, there should be some clearance between the edge of the bottom surface 15 and spring member 22 to allow it to move inwardly towards the member and outwardly away from the end member upon which it is attached. Furthermore, it can be seen that with this type of construction, that the circumferential lengths of element 22 and binding straps 42 and 43 remain relatively constant whereas the outer periphery of the thumb increases slightly with a pulse from the circulatory system, thus causing member 22 to be deflected further and causing strain gauge 27 to vary in its electrical properties.

It should also be recognized that the sensor is not necessarily restricted to the use upon the fingers and toes of the human body, but may be made of a slightly different size and shape to accommodate other members of the body such as the arms and legs, where they produce enough of a change in the immediate volume of the member adjacent to the sensor to produce the desired deflection. As indicated previously, deflection of the spring member 22 which for one particular application is approximately two inches long, of one ten thousandth of an inch or less is sufficient to produce a change in the electrical properties of the strain gauge and produce a usable output signal therefrom. From the foregoing description of the invention, it will be seen that a blood pulse sensor has been provided which is extremely sensitive and does not require elaborate apparatus for attaching to a member of the body. Because of its rather simple construction, it is also extremely reliable and may be used to provide a signal for any type of indication for an observer or may be used in conjunction with a recorder. The structure is not painful when used upon the patient and if applied in the manner indicated, the sensor measures the slight change in volume of the member to which it is attached during the heartbeat.

It will, of course, be understood that various changes may be made in the form, details, arrangement and proportions of the parts without departing from the scope of our invention which consists of the matter shown and described herein and set forth in the appended claims.

We claim:
1. A blood pulse sensor comprising:
(a) a deflection member constructed and arranged to be pivotally supported and deflected about its central transverse axis, said member extending longitudinally to define a longitudinal axis perpendicular to said transverse axis;
(b) a strain gauge fixedly fastened to said deflection member so that deflection of said strain gauge is obtained when said deflection member is deflected through a small increment about said transverse axis;
(c) a flexible band fastened to said deflection member for holding said deflection member under moderate pressure along its longitudinal axis against a body appendage in a deflected position, but where the circumferential length of said flexible band and said deflection member are greater than the circumferential dimensions of such body appendage;
(d) and electrical appartus connected to said strain gauge to provide electrical signals representative of a temporary increased deflection caused by a temporary change in appendage volume due to a slight rise in blood pressure within an artery of such appendage created by heart beat action.

2. A blood pulse sensor comprising:
(a) a housing having an opening formed therein including a fulcrum member within said opening;
(b) a longitudinal spring member mounted for deflection upon said fulcrum member within said opening, the deflection being about the fulcrum member;
(c) a strain gauge fixedly fastened to said spring member and aligned to deflect with said longitudinal member;
(d) means fastened to the ends of said spring member for binding said housing against a body appendage and deflecting said longitudinal member to a position beyond its undeflected plane, so that said longitudinal member and said strain gauge are further deflected upon a temporary increase in appendage volume caused by a temporary increase in blood pressure within an artery of such appendage created by heart beat action;
(e) and electrical current conductors connected to said strain gauge to provide electrical signals in synchronism with such heart beat and temporary change in such body appendage volume.

3. A blood pulse sensor comprising:
(a) a housing of general block shape having a concave bottom surface and a channel formed therein within the upper portion of said housing, the bottom of said channel lying above the bottom surface of said housing;
(b) a spring member mounted for deflection within said channel, the deflection being towards and away from the bottom of said channel;
(c) a strain gauge fixedly fastened to said spring member and aligned parallel with said spring member;
(d) binding material fixedly fastened to the ends of said spring member for binding said housing against a body appendage and deflecting said spring member to a position between its undeflected plane and the bottom of said slot so that said spring member and said strain gauge are deflected towards such body appendage upon a temporary increase in appendage volume due to a temporary increase in blood pressure within an artery of such appendage created by heart beat action;
(e) and electrical current conductors connected to said strain gauge to provide electrical signals in synchronism with such heart beat and temporary change in such body appendage volume.

4. A blood pulse sensor comprising:
(a) a housing of general block shape including a cover and having a concave bottom surface and a slot formed longitudinally within the upper portion of said housing, the bottom of said slot lying above, but following substantially the same general concave bottom surface of said housing;
(b) a spring steel member releasably and centrally mounted for deflection within said slot, the deflection being towards and away from the bottom of said slot;
(c) an elongated strain gauge fixedly fastened to the center of the upper surface of said spring steel member and aligned parallel to said slot length;
(d) strip-like binding material fixedly fastened to the ends of said spring steel member for binding said housing against a body appendage and deflecting said spring steel member to a position below its undeflected plane but above the bottom of said slot so that said spring steel member and said strain gauge are further deflected towards such body appendage upon a temporary increase in appendage volume caused by a temporary increase in blood pressure within an artery of such appendage created by heart beat action;

(e) and electrical current conductors connected to said strain gauge to provide electrical signals in synchronism with such heart beat and temporary change in such body appendage volume.

5. The invention as set forth in claim 4 wherein said elongated strain gauge is of the type employing a piezo effect so that upon being subjected to stresses, its internal resistance is changed.

References Cited in the file of this patent
UNITED STATES PATENTS

| | | |
|---|---|---|
| 2,535,998 | Bierman | Dec. 26, 1950 |
| 2,848,992 | Pigeon | Aug. 26, 1958 |
| 2,854,968 | Wright | Oct. 7, 1958 |
| 2,875,750 | Boucke | Mar. 3, 1959 |